US008168047B1

(12) United States Patent
Smith

(10) Patent No.: US 8,168,047 B1
(45) Date of Patent: May 1, 2012

(54) HHO ELECTROLYSIS CELL FOR INCREASED VEHICLE FUEL MILEAGE

(76) Inventor: Jerry Smith, Littleton, CO (US)

( * ) Notice: Subject to any disclaimer, the term of this patent is extended or adjusted under 35 U.S.C. 154(b) by 714 days.

(21) Appl. No.: 12/290,331

(22) Filed: Oct. 29, 2008

(51) Int. Cl.
*C25B 9/12* (2006.01)
*F02B 43/10* (2006.01)

(52) U.S. Cl. ...... 204/255; 123/3; 204/228.1; 204/275.1; 204/278; 204/278.5

(58) Field of Classification Search ............... 204/228.1, 204/255, 275.1, 278, 278.5; 123/3
See application file for complete search history.

(56) References Cited

U.S. PATENT DOCUMENTS

| | | | | |
|---|---|---|---|---|
| 3,648,668 | A * | 3/1972 | Pacheco | 123/3 |
| 3,763,024 | A * | 10/1973 | Engelmann et al. | 205/799 |
| 3,994,798 | A * | 11/1976 | Westerlund | 204/268 |
| 4,023,545 | A * | 5/1977 | Mosher et al. | 123/3 |
| 4,369,737 | A * | 1/1983 | Sanders et al. | 123/3 |
| 4,442,801 | A * | 4/1984 | Glynn et al. | 123/3 |
| 4,726,888 | A * | 2/1988 | McCambridge | 205/630 |
| 5,143,025 | A * | 9/1992 | Munday | 123/3 |
| 5,159,900 | A * | 11/1992 | Dammann | 123/3 |
| 5,305,715 | A * | 4/1994 | Nissley | 123/3 |
| 5,450,822 | A * | 9/1995 | Cunningham | 123/3 |
| 5,543,030 | A * | 8/1996 | Shiramizu et al. | 205/464 |
| 6,257,175 | B1 * | 7/2001 | Mosher et al. | 123/3 |
| 7,318,885 | B2 * | 1/2008 | Omasa | 204/273 |
| 7,452,451 | B2 * | 11/2008 | Kitada et al. | 204/291 |
| 2002/0074237 | A1 * | 6/2002 | Takesako et al. | 205/628 |
| 2004/0076563 | A1 * | 4/2004 | Kitada | 422/211 |
| 2004/0094408 | A1 * | 5/2004 | Omasa | 204/273 |
| 2004/0149591 | A1 * | 8/2004 | Klein et al. | 205/628 |
| 2005/0011765 | A1 * | 1/2005 | Omasa | 204/633 |
| 2005/0051426 | A1 * | 3/2005 | Kitada et al. | 204/290.01 |
| 2005/0175517 | A1 * | 8/2005 | Kitada | 422/186 |
| 2008/0053821 | A1 * | 3/2008 | Suzuki et al. | 204/252 |
| 2008/0226954 | A1 * | 9/2008 | Gil et al. | 429/17 |
| 2008/0296171 | A1 * | 12/2008 | Davidson | 205/639 |
| 2010/0132661 | A1 * | 6/2010 | Klein et al. | 123/299 |

\* cited by examiner

*Primary Examiner* — Arlen Soderquist
(74) *Attorney, Agent, or Firm* — Edwin H. Crabtree; Ramon L. Pizarro

(57) ABSTRACT

A HHO electrolysis cell mounted in a vehicle for creating hydrogen The hydrogen is mixed with a vehicle's fuel supply for increased fuel mileage. The electrolysis cell includes a cell housing for holding water. A plurality of positive electrode plates are mounted inside the cell housing and attached to a positive pole mounted on top of the cell housing. The positive pole is adapted for connection to a vehicle's electrical source. A plurality of negative electrode plates are mounted inside the housing and indexed in a spaced relationship between each of the positive electrode plates. The negative electrode plates are attached to a negative pole mounted on top of the cell housing. The negative pole is also adapted for connection to a vehicle's electrical source. The negative electrode plates are attached to a moveable plate rod mounted inside the cell housing. One end of the moveable rod is adapted for attachment to a linkage assembly connected to a vehicle's fuel system. As the vehicle accelerates in speed from idle, the plate rod moves the negative plates toward the positive plates, thus increasing the amount of electrolysis of the water in the cell housing and thus increasing the amount of hydrogen generated therein. The hydrogen is discharged out a hydrogen fuel port in the top of the cell housing to the fuel system.

10 Claims, 4 Drawing Sheets

HHO ELECTROLYSIS CELL FOR INCREASED VEHICLE FUEL MILEAGE

BACKGROUND OF THE INVENTION (a) Field of the Invention

This invention relates to a HHO electrolysis cell for generating hydrogen that is mixed with a fuel and more particularly, but not by way of limitation, to a HHO electrolysis cell mounted in a vehicle. The cell is used for creating adjustable amounts of hydrogen that is mixed with a fuel supply to a vehicle or other types of fuel driven stationary and portable equipment for improved fuel economy.

(b) Discussion of Prior Art

Heretofore, there have been a number of different types of HHO electrolysis cells used for generating hydrogen and mixing the hydrogen with a vehicle fuel. None of these prior art cells provide for generating increased amounts of hydrogen to a vehicle fuel system when the vehicle accelerates from idle to a desired vehicle speed. Also, the cell is designed to maintain the increased hydrogen supply to the fuel system during the desired vehicle speed.

SUMMARY OF THE INVENTION

In view of the foregoing, it is a primary objective of the subject invention to provide hydrogen to different types of vehicle fuel systems for increased mileage and fuel efficiency. Also, the cell is designed to increase the amount of hydrogen to the fuel system with increased vehicle speed from idle.

Still another object of the invention is the HHO electrolysis cell can also be used for applications other than vehicles, such as gas generators, stationary and portable gas and diesel engines and similar fuel applications where increased fuel efficiency is desired.

Yet another object of the invention is the cell can be easily mounted inside a vehicle and attached to a vehicle's battery and fuel system for becoming operational. Also, the cell can be used with various types of fuel systems for operating stationary and portable equipment with improved fuel economy.

The subject invention includes a cell housing for holding water. A plurality of positive electrode plates are mounted inside the cell housing and attached to a positive pole mounted on top of the cell housing. The positive pole is adapted for connection to a vehicle's battery positive pole. A plurality of negative electrode plates are mounted inside the housing and indexed in a spaced relationship between each of the positive electrode plates. The negative electrode plates are attached to a negative pole mounted on top of the cell housing. The negative pole is adapted for connection to a vehicle's battery negative pole. The negative electrode plates are attached to a moveable plate rod mounted inside the cell housing. One end of the moveable rod is adapted for attachment to a linkage assembly connected to a vehicle's fuel system. As the vehicle accelerates in speed from idle, the plate rod moves the negative plates toward the positive plates, thus increasing the amount of electrolysis of the water in the cell housing and thus increasing the amount of hydrogen generated therein. The hydrogen is discharged out a hydrogen fuel port in the top of the cell housing. The fuel port is connected to the vehicle's fuel system for mixing with the vehicle's fuel supply for increased mileage and fuel economy.

These and other objects of the present invention will become apparent to those familiar with electrolysis cells for creating adjustable amounts of hydrogen used in a fuel mixture for vehicles and other fuel operated equipment when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figures 1, 2:
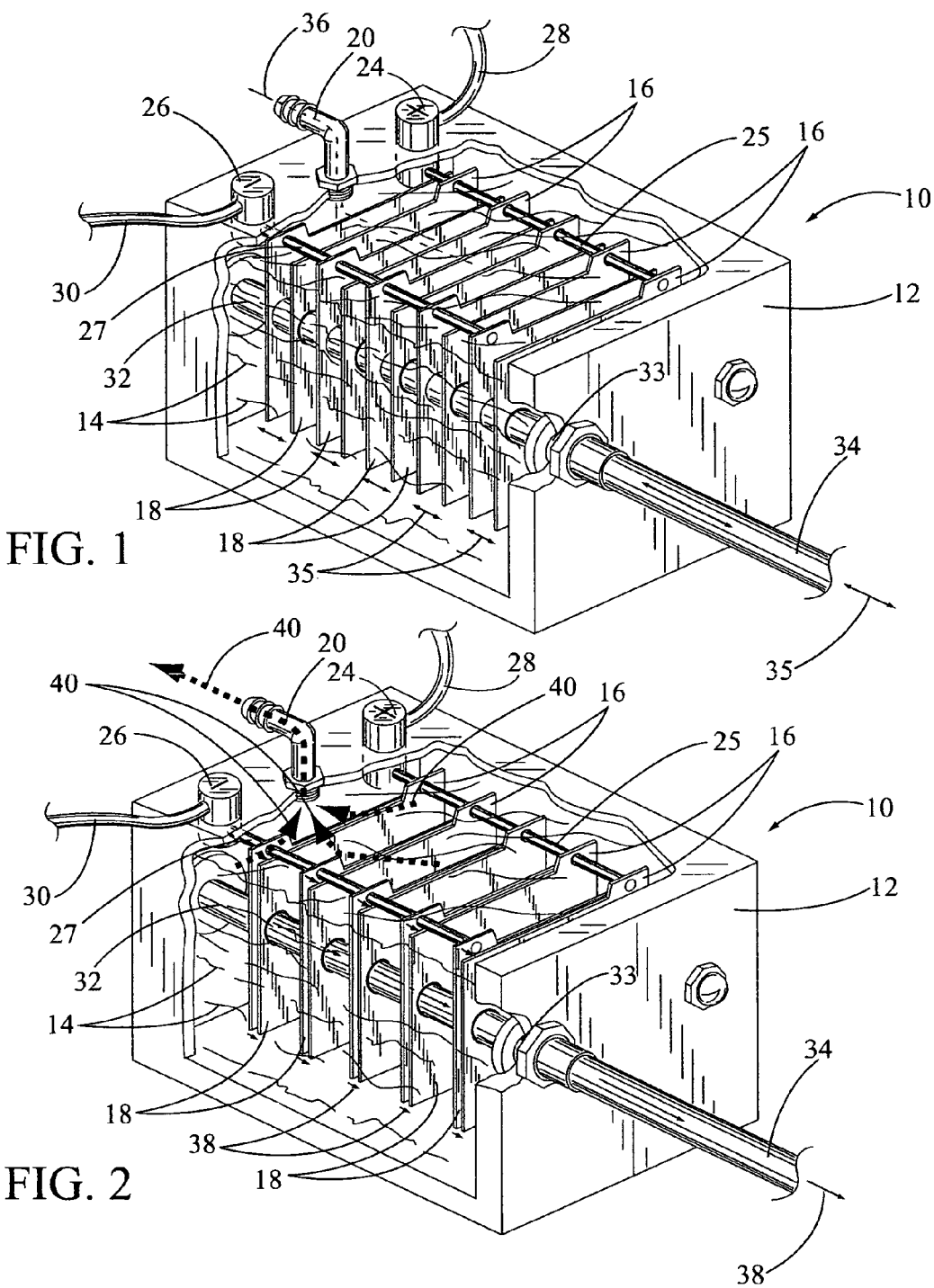
FIG. 1 is a perspective view of the subject HHO electrolysis cell with a portion of a cell housing cut away to illustrate spaced apart positive and negative electrode plates. The cell housing includes positive and negative electrode poles, a moveable plate rod and a hydrogen fuel port.
FIG. 2 is anther perspective view of the cell housing with the plate rod moving the negative electrode plates closer to the positive electrode plates for increased hydrogen output during increased speeds and acceleration.

In FIG. 1, a perspective view of the subject HHO electrolysis cell is shown and having general reference numeral 10. The cell 10 includes a cell housing 12 wherein a portion of the housing has been cut away to illustrate water stored therein, shown as wave lines 14, and a plurality of vertically mounted, spaced apart positive electrode plates 16 and negative electrode plates 18. The plates 16 and 18 are used, by electrolysis to generate hydrogen in adjustable amounts, which is discharged out a hydrogen fuel port 20 mounted in a top 22 of the housing 12. Also mounted in the top 22 of the housing is positive electrode pole 24 and a negative electrode pole 26. The positive electrode plates 16 are connected to the positive electrode pole 24 using a positive plate arm 25. The negative electrode plates 18 are connected to the negative electrode pole 26 using a negative plate arm 27. The two poles 24 and 26 are adapted for connecting to a vehicles electrical power source, such as a battery, a generator and the like, using a positive pole cable 28 and a negative pole cable 30. The electrical power source isn't shown in drawings.

The electrolysis cell 10 also includes a horizontal, moveable plate rod 32 mounted inside the cell housing 12 and attached to the negative plates 18. The rod 32 is received through holes in the positive plates 16 and doesn't contact the sides of the holes. One end 33 of the moveable plate rod 32 extends outside the cell housing 12 and is adapted for coupling to a linkage assembly 34. The moveable plate rod 32 moves the electrode plates 18 to the right and during acceleration, as shown in FIGS. 2 and 4 and to the left and during deceleration and idle, as shown in this drawing and FIG. 3. The right and left movement of the rod 32 is shown as arrows 35.

The linkage assembly 34 is connected mechanically to a vehicle's fuel system, such as a carburetor with fuel pump and fuel tank, for responding to acceleration and deceleration of the vehicle with increased and decreased fuel demand. The amount of hydrogen generated in this drawing and during vehicle idle is shown as small arrows 36.

It should be noted that while the electrolysis cell is discussed herein used with a vehicle's fuel system, it should be kept in mind the electrolysis cell can be used equally well for other types of fuel systems used with stationary and portable equipment, such as gas and diesel generators, compressors, pumps and similar equipment.

In FIG. 2, another perspective view of the cell housing 12 is shown. In this drawing, the plate rod 32 has been activated by the linkage assembly 34 and has moved the negative electrode plates 18 to the right, as indicated by arrows 38, and closer to the positive electrode plates 16 for increased hydrogen output, as shown as large arrows 40, through the hydrogen fuel port 20. The increased hydrogen 40 is circulated to the vehicle's fuel system for mixing with the fuel supply during increased speeds.

Figure 3:
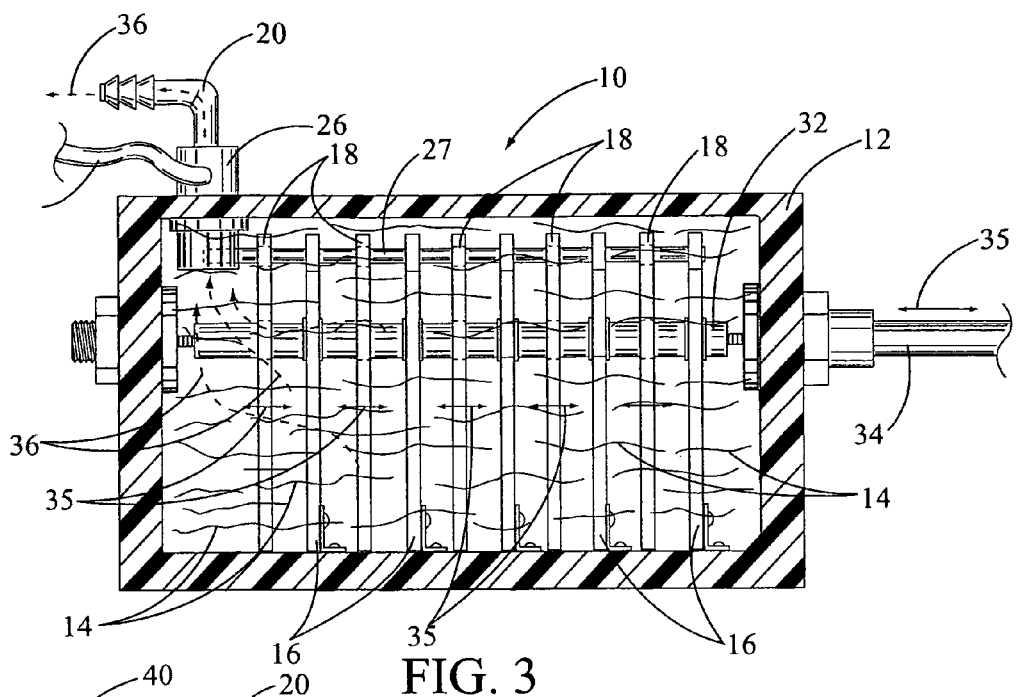
FIG. 3 is a front sectional view of the cell housing illustrating the negative electrode plates in a spaced relationship with the positive electrode plates and generating hydrogen, as indicated by small arrows, typically when the vehicle is idling.
Figure 4:
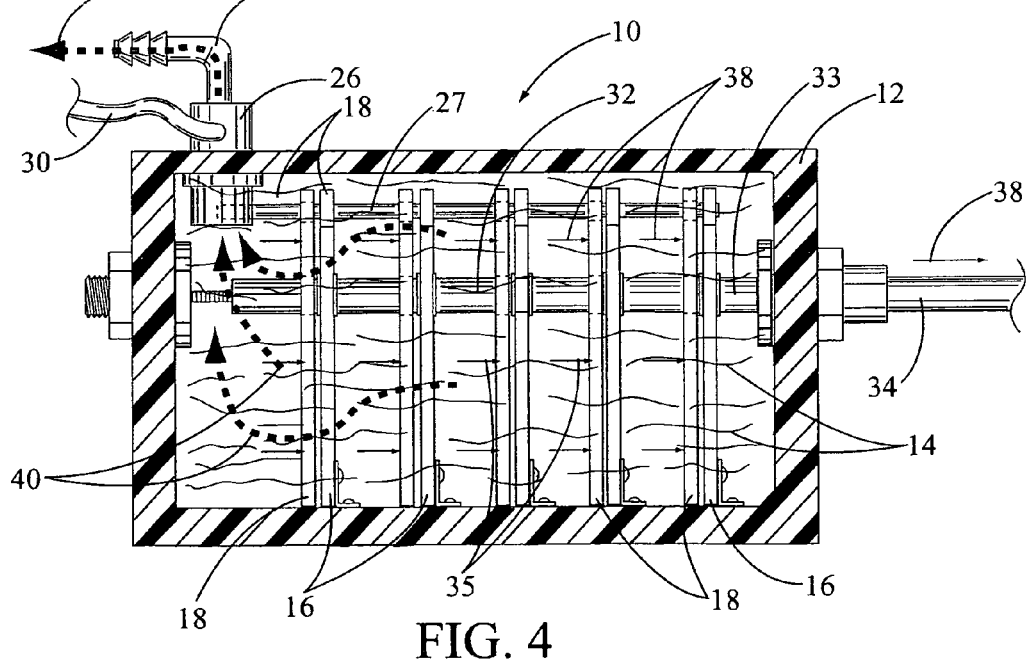
FIG. 4 is another front sectional view of the cell housing and illustrating the plate rod having moved the negative electrode plates next to the positive electrode plates for increased hydrogen output, as indicated by large arrows.

In FIG. 3, a front sectional view of the cell housing 12 is shown illustrating the negative electrode plates 18 disposed in a spaced relationship with the positive electrode plates 16 and generating hydrogen, as indicated by small arrows 36. This position of the electrode plates 16 and 18 is typical when the vehicle is idling or at low travel speeds.

In FIG. 4, another front sectional view of the cell housing 12 is shown and illustrating the moveable plate rod 32 having moved the negative electrode plates 18 next to the positive electrode plates 18 during acceleration or increased fuel demand and generating increased amounts of hydrogen, as indicated by large arrows 40. This position of the electrode plates 16 and 18 next to each other would be typical when the vehicle is accelerating or during increased demand for hydrogen output.

Figure 5:
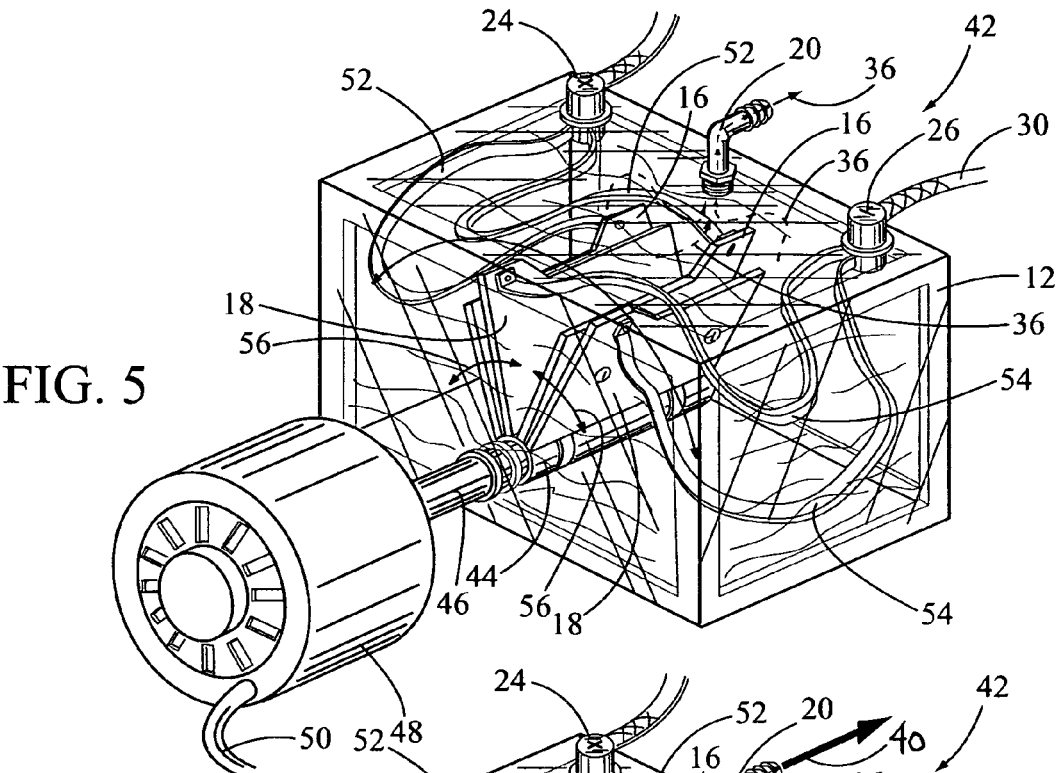
FIG. 5 is a perspective view of an alternate embodiment of the HHO electrolysis cell where two pair of positive and negative electrode plates are spaced apart and mounted on a horizontal, rotating shaft. The shaft is mounted in the bottom of the cell housing. One end of the rotating shaft is adapted for attachment to a drive motor electrically connected to a vehicle's fuel system

In FIG. 5, a perspective view of an alternate embodiment of the HHO electrolysis cell is shown and having general reference numeral 42. In this example, the cell housing 12 has two pair of positive and negative electrode plates 16 and 18 spaced apart and mounted on a horizontal rotating shaft 44 mounted in the bottom of the housing. One end 46 of the rotating shaft 44 is adapted for attachment to a drive motor 48 connected electrically to the vehicle's fuel system using electric lead 50. While two pair of the positive and negative electrode plates 16 and 18 are shown in the drawings, it can be appreciated that a single pair of electrode plates or any number of electrode plates can be mounted on the rotating shaft 44. In this drawing, the positive electrode plates 16 are attached to the positive pole 24 using a flexible, positive, electrode plate lead 52. Also, the negative electrode plates are attached to the negative pole 26 using a flexible, negative, electrode plate lead 54.

The drive motor 48, under the control of the vehicle's fuel system, oscillates or vibrates at a predetermined frequency the two pair of positive and negative electrode plates 16 and 18 back and forth, as indicated by small, oscillating arrows 56, inside cell housing 12 for generating hydrogen, indicated by small arrows 36. This oscillation of the electrode plates typically will produce a small amount of hydrogen for mixing with the fuel supply during the idle of the vehicle.

Figure 6:
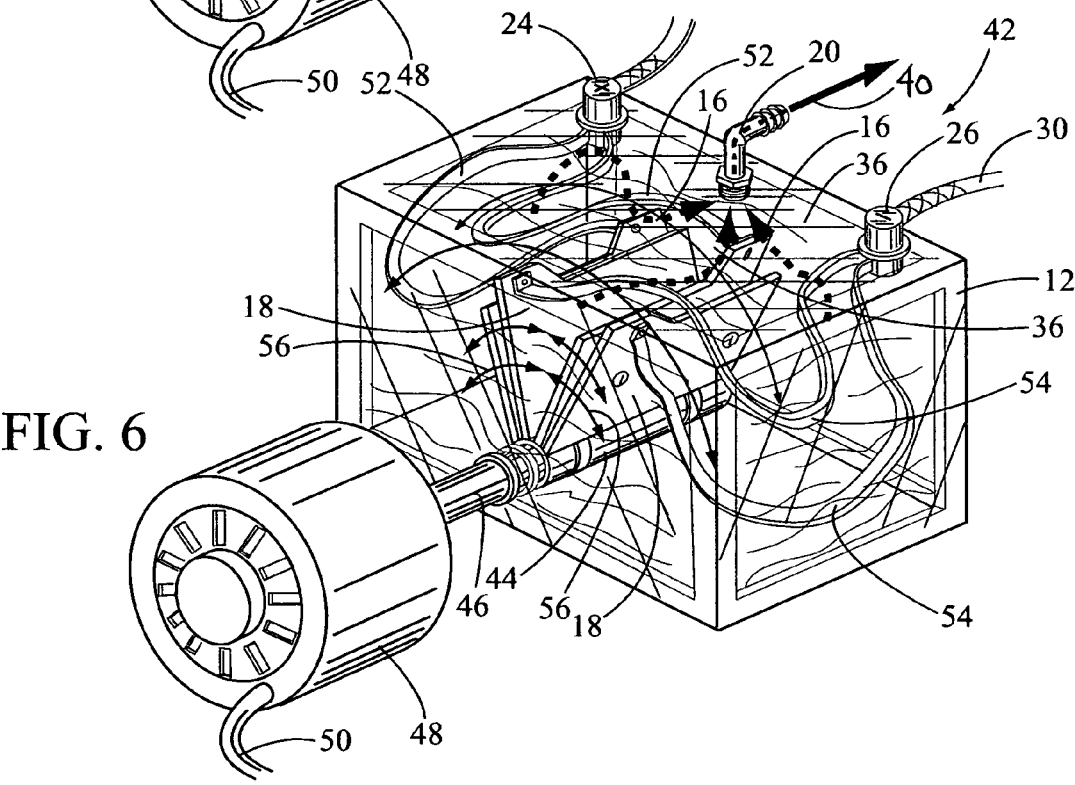
FIG. 6 is another perspective view of the alternate embodiment of the HHO electrolysis cell with the two pair of positive and negative electrode plates oscillating at an increased speed on the rotating shaft for increased demand of hydrogen during the vehicle's increased speed and acceleration.

In FIG. 6, another perspective view of the alternate embodiment of the HHO electrolysis cell 42 is shown with the two pair of positive and negative electrode plates 16 and 18 moving at an increased speed on the rotating shaft. The increased speed is indicated by large arrows 58. The increased demand of hydrogen is indicated by the large arrows 40, during the vehicle's increased speed.

Figures 7, 8:
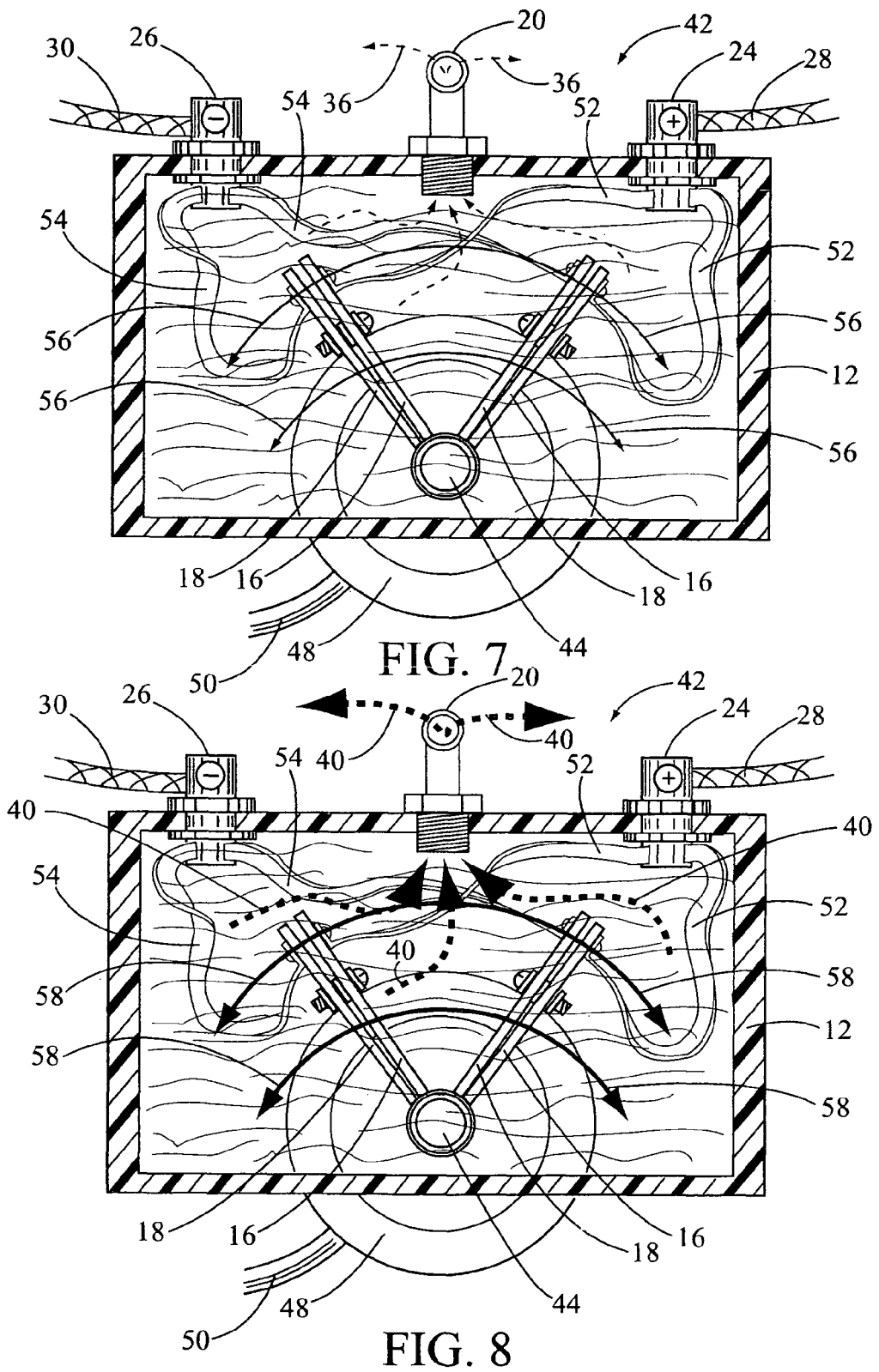
FIG. 7 is front sectional view of the electrolysis cell shown in FIG. 5 and with the negative and positive electrode plates attached to negative and positive poles on top of the cell housing. The cell is shown generating hydrogen, as indicated by small arrows, when the vehicle is idling.
FIG. 8 is a front sectional view of the electrolysis cell shown in FIG. 6 with the electrode plates generating increased hydrogen, as indicated by large arrows, when the vehicle accelerates in speed.

In FIG. 7, a front sectional view of the electrolysis cell housing 12 is shown with the positive and negative electrode plates 16 and 18 attached to the negative and positive poles 24 and 26 using the flexible, positive and negative electrode leads 52 and 54. Similar to FIG. 5, the electrolysis cell 42 is shown generating hydrogen, as indicated by small arrows 36, when the vehicle is idling.

In FIG. 8, a front sectional view of the electrolysis cell housing 12 is shown with the positive and negative electrode plates 16 and 18 generating increased hydrogen by rapid oscillation of the plates, as indicated by large arrows 58, when the vehicle accelerates in speed.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An electrolysis cell for generating adjustable amounts of hydrogen to a fuel system of a vehicle and having an electrical source, the cell adapted for attachment to a vehicle's carburetor and adapted for being responsive to acceleration and deceleration of the vehicle, the cell comprising:
   a cell housing for holding water therein;
   a plurality of positive electrode plates disposed inside the cell housing, the positive electrode plates connected to a positive pole, the positive pole adapted for connection to the electrical source;
   a plurality of negative electrode plates disposed inside the cell housing, the negative electrode plates connected to a negative pole, the negative pole adapted for connection to the electrical source, each of the negative electrode plates indexed with and spaced between each of the positive electrode plates;
   a hydrogen discharge port disposed on cell housing and adapted for connection to the fuel system; and
   a moveable plate rod attached to the negative plates, one end of the rod extending outwardly from the cell housing and adapted for attachment to the vehicle's fuel system, the moveable plate rod moving the negative electrode plates toward the positive electrode plates during vehicle acceleration, the moveable plate rod moving the negative electrode plates away from the positive plates during vehicle deceleration and idle.

2. The cell as described in claim 1 further including a positive plate arm attached to the positive electrode plates, the positive plate arm connected to the positive pole, and a negative plate arm attached to the negative electrode plates, the negative plate arm attached to the negative pole.

3. The cell as described in claim 1 wherein the positive and negative electrode plates are mounted vertically inside the cell housing.

4. The cell as described in claim 1 wherein the positive and negative poles and the hydrogen discharge port are mounted on top of the cell housing.

5. An electrolysis cell for generating adjustable amounts of hydrogen to a fuel system of a vehicle and having an electrical source, the cell adapted for attachment to a vehicle's carburetor and adapted for being responsive to acceleration and deceleration of the vehicle, the cell comprising:

a cell housing for holding water therein;

a plurality of positive electrode plates vertically mounted inside the cell housing, a positive pole mounted on top of the cell housing, the positive pole adapted for connection to the electrical source;

a positive plate arm attached to the positive electrode plates, one end of the positive plate arm attached to the positive pole;

a plurality of negative electrode plates vertically mounted inside the cell housing, each of the negative electrode plates indexed with and spaced between each of the positive electrode plates;

a negative pole mounted on top of the cell housing, the negative pole adapted for connection to the electrical source;

a negative plate arm attached to the negative electrode plates, one end of the negative plate arm attached to the negative pole;

a hydrogen discharge port disposed on cell housing and adapted for connection to the fuel system; and a moveable plate rod attached to the negative plates, one end of the rod extending outwardly from the cell housing and adapted for attachment to the vehicle's fuel system, the moveable plate rod moving the negative electrode plates toward the positive electrode plates during vehicle acceleration, the moveable plate rod moving the negative electrode plates away from the positive plates during vehicle deceleration and idle.

6. The cell as described in claim 5 wherein the positive and negative poles and the hydrogen discharge port are mounted on top of the cell housing.

7. An electrolysis cell for generating adjustable amounts of hydrogen to a vehicle fuel system or similar fuel driven equipment having an electrical source, the cell adapted for attachment to a vehicle's carburetor and adapted for being responsive to acceleration and deceleration of the vehicle, the cell comprising:

a cell housing for holding water therein:

at least one positive electrode plate disposed inside the cell housing and connected to a positive pole on the cell housing, the positive pole adapted for connection to the electrical source;

at least one negative electrode plate disposed inside the cell housing and connected to a negative pole on the cell housing, the negative pole adapted for connection to the electrical source, the negative electrode plate disposed next to and in a spaced relationship to the positive electrode plate for generating adjustable amounts of hydrogen in the cell housing;

a hydrogen discharge port disposed on cell housing and adapted for connection to the fuel system; and means for oscillating the positive and negative electrode plates back and forth inside the cell housing and attached thereto, the means for oscillating increasing the oscillation of the electrode plates for increased demands of hydrogen during vehicle acceleration, the means for oscillation decreasing the oscillation of the electrode plates for decreased demands of hydrogen during vehicle deceleration and idle, the means for oscillating adapted for connection to the vehicle fuel system.

8. The cell as described in claim 7 wherein the means for oscillating is a rotating shaft, one end of the shaft attached to a drive motor, the drive motor adapted for being electrically connected to the vehicle's fuel system, the positive and negative electrode plates attached to the rotating shaft.

9. The cell as described in claim 8 wherein a plurality of positive and negative electrode plates are attached to the rotating shaft.

10. The cell as described in claim 7 wherein the positive and negative poles and the hydrogen discharge port are mounted on top of the cell housing.

* * * * *